(12) United States Patent
Friedman

(10) Patent No.: US 9,371,018 B1
(45) Date of Patent: Jun. 21, 2016

(54) HEAD RESTRAINT APPARATUS

(71) Applicant: Diana M. Friedman, Evanston, IL (US)

(72) Inventor: Diana M. Friedman, Evanston, IL (US)

(73) Assignee: Diana M. Friedman, Evanston, IL (US)

( * ) Notice: Subject to any disclaimer, the term of this patent is extended or adjusted under 35 U.S.C. 154(b) by 0 days.

(21) Appl. No.: 14/679,298

(22) Filed: Apr. 6, 2015

Related U.S. Application Data

(60) Provisional application No. 61/975,299, filed on Apr. 4, 2014.

(51) Int. Cl.
*B60N 2/48* (2006.01)
*B60N 2/28* (2006.01)

(52) U.S. Cl.
CPC ............ *B60N 2/2851* (2013.01); *B60N 2/4879* (2013.01)

(58) Field of Classification Search
USPC .......................................... 297/393, 397, 464
See application file for complete search history.

(56) References Cited

U.S. PATENT DOCUMENTS

| | | | | |
|---|---|---|---|---|
| 4,707,031 A * | 11/1987 | Meistrell | ............... | B60R 22/001 128/869 |
| 5,378,042 A * | 1/1995 | Daneshvar | ............. | A47C 7/383 128/847 |
| 5,395,158 A * | 3/1995 | Cordia | .................. | A61F 5/3707 297/393 |
| 6,266,825 B1 * | 7/2001 | Floyd | ..................... | A47C 7/383 2/311 |
| 6,301,716 B1 * | 10/2001 | Ross | ..................... | A61F 5/3707 2/171 |
| 6,607,245 B1 * | 8/2003 | Scher | ..................... | A47C 7/383 297/393 |
| 7,628,456 B1 * | 12/2009 | Swartz | ................... | A47C 7/383 297/393 |
| 7,740,318 B2 | 6/2010 | Funke et al. | | |
| 7,832,802 B2 | 11/2010 | Ehlers et al. | | |
| 8,191,969 B2 | 6/2012 | Demaras | | |
| 8,287,045 B1 | 10/2012 | Donohue et al. | | |
| 8,381,316 B2 * | 2/2013 | Edwards | ............... | A42B 1/006 2/175.3 |
| 8,662,590 B2 | 3/2014 | Bogen | | |
| 8,726,419 B2 | 5/2014 | Vahey | | |
| 8,820,838 B1 | 9/2014 | Palmer | | |
| 8,834,394 B2 * | 9/2014 | Ghajar | .................... | A61F 5/055 128/846 |
| 8,967,720 B2 * | 3/2015 | Davis | ................... | B60R 22/001 297/216.12 |
| 2002/0067063 A1 * | 6/2002 | Taborro | ............... | B60N 2/4879 297/397 |
| 2004/0124685 A1 * | 7/2004 | Buch | .................... | B60N 2/4879 297/393 |
| 2011/0043025 A1 * | 2/2011 | Park | ..................... | B60N 2/4879 297/393 |
| 2013/0020853 A1 * | 1/2013 | Gibson | .................. | A47C 7/383 297/464 |
| 2014/0145487 A1 * | 5/2014 | Donohue | ............. | B60N 2/4885 297/393 |
| 2015/0042143 A1 * | 2/2015 | Maginness | ............. | A47C 7/383 297/393 |
| 2015/0298589 A1 * | 10/2015 | Zaouk | ................. | B60N 2/4879 297/393 |

* cited by examiner

*Primary Examiner* — Timothy J Brindley
(74) *Attorney, Agent, or Firm* — Burns & Levinson LLP; Bruce D. Jobse

(57) ABSTRACT

An accessory device that gently restrains a child's forehead to prevent his or her head from bobbing when asleep in a car seat includes head retention piece with outwardly extending center and side bands for securing the accessory device to the child car seat.

18 Claims, 3 Drawing Sheets

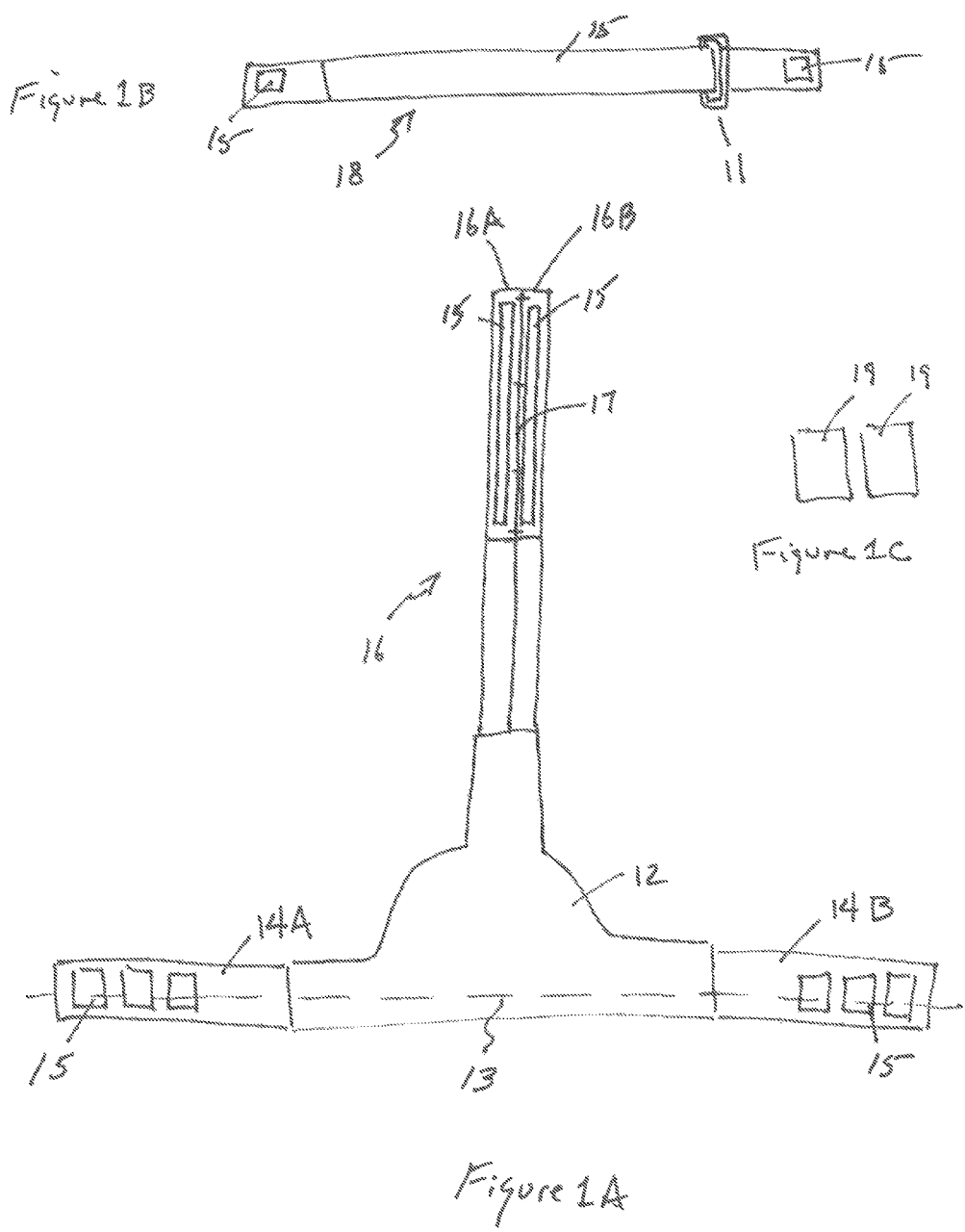

HEAD RESTRAINT APPARATUS

FIELD OF THE INVENTION

Figure 2B:
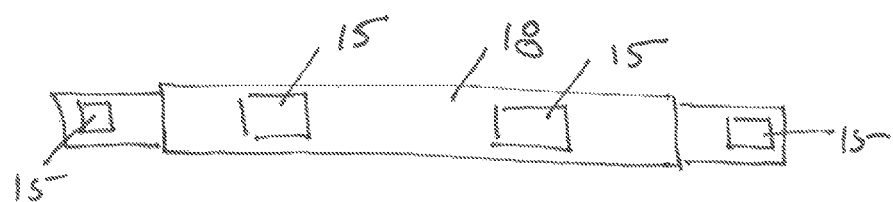

The disclosure relates to child comfort and potentially safety, and, more particularly to a forehead restraint accessory for use with child car seats.

BACKGROUND OF THE INVENTION

When children fall asleep in an upright seated position, particularly children while sitting in a car safety seat, their heads tend to bob forward or to the side. Such positions are uncomfortable and can often lead to frequent sleep interruption and sore muscles, particularly in the neck, shoulders and head. Accordingly, need exists for an apparatus or device which may be used with commercially available child car seats which will prevent the child's head and neck from gravitating to one or more uncomfortable positions when the child is asleep within the car seat.

SUMMARY OF THE INVENTION

Disclosed is an accessory device, herein referred to as the "bobstop", for use in conjunction with child car seats that gently restrains a child's forehead to prevent his or her head from bobbing when asleep in a car seat. According to one aspect of the disclosure, the accessory device comprises a head retention piece and means for securing the head retention piece securely to the child car seat. In one embodiment, the accessory device comprises a head retention piece with side bands and a center back band, which are selectively engageable and disengagable to form a loop, with a center band extending between and securable/adjustable to the head retention piece and a back band. The back band is securable to the child car seat to retain the accessory securely thereto. The front head retention piece rests adjacent the child's forehead and may optionally be decorated with a graphic or fabric which is aesthetically pleasing or inviting to the child occupant of the car seat.

According to one aspect of the disclosure, a head restraint apparatus for use with car seats comprises: a head retention piece; a pair of side bands extending outward from the head retention piece in opposite directions along a common axis; and a center band extending outward from the head retention piece in a direction substantially normal to the common axis, wherein the side bands and center band are securable together about a car seat. In one embodiment, the apparatus further comprises a backband securable to one of the side bands and center band. In other embodiments, the back band is securable to the side bands and center band. In other embodiments, the center band is implemented with a pair of bands secured to each other at plural locations along respective lengths thereof so that adjacent locations at which the pair of bands are secured together define a slit allowing passage of an object, such as a car seat tether or safety belt, through the center band.

According to another aspect of the disclosure, a kit comprises: a head restraint apparatus for use with car seats comprising a head retention piece having a pair of side bands extending outward therefrom along a common axis and a center band extending outward from the head retention piece in a direction substantially normal to the common axis; a back band securable to the side bands and center band; one or more securing means for securing any of the side bands, center band, or back band to the car seat.

According to still another aspect of the disclosure, method for securing a head restraint apparatus to a car seat, the method comprises: providing a head restraint apparatus comprising a head retention piece having a pair of side bands extending outward therefrom along a common axis and a center band extending outward from the head retention piece in a direction substantially normal to the common axis; adjustably or removably securing the side bands about sides of a car seat with a back band; adjustably or removably securing the center band about a top of the car seat with a back band; and removably securing the back band to the car seat.

DESCRIPTION THE DRAWINGS

Figure 2C:
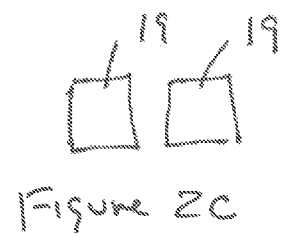
Figure 2A:
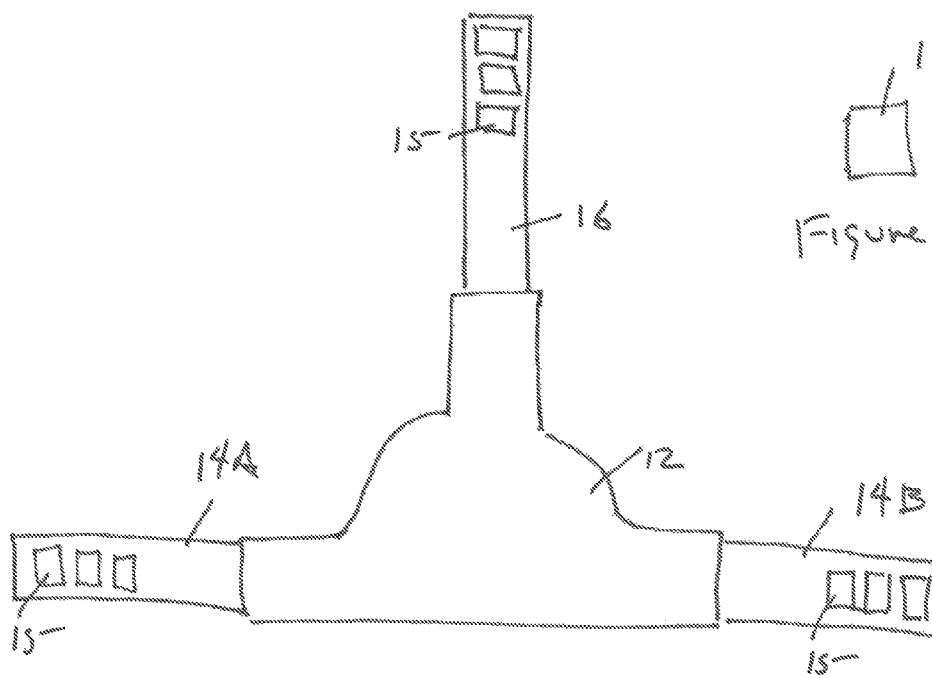
Figure 3B:
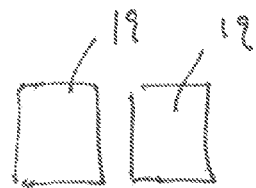
Figure 3A:
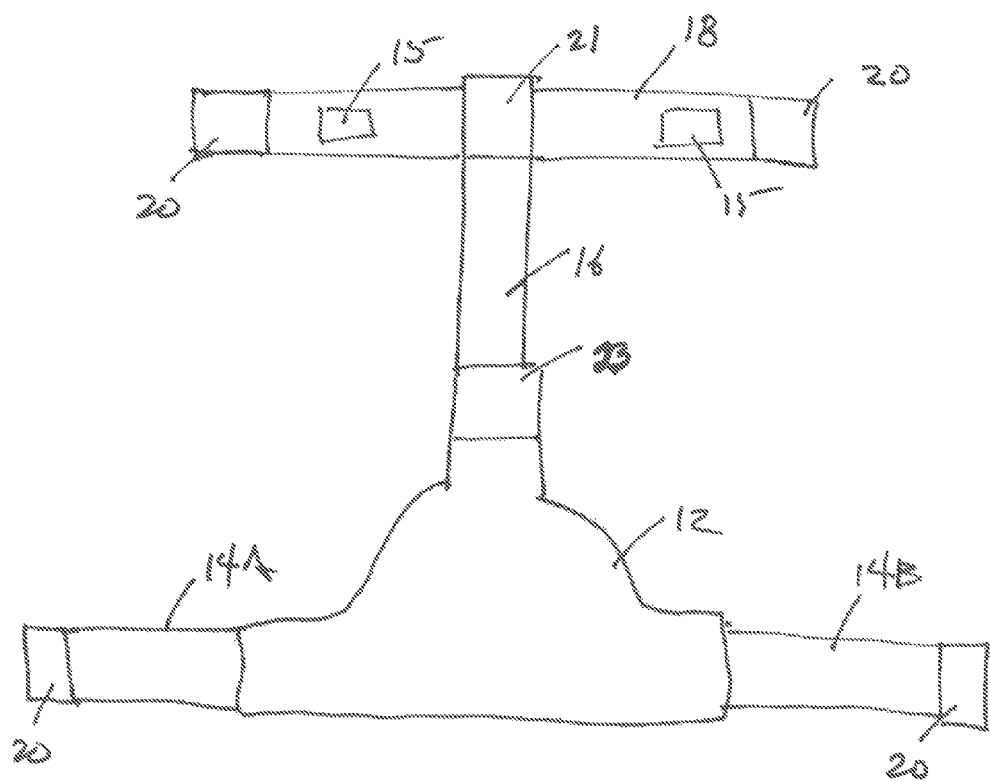

FIGS. 1A-C illustrate conceptually a rear plan view of an accessory device kit and component parts for securing to a child car seat in accordance with the disclosure;

FIGS. 2A-C illustrate conceptually a rear plan view of another accessory device kit and component parts for securing to a child car seat in accordance with the disclosure; and FIGS. 3A-B illustrate conceptually a rear plan view of another accessory device kit and component parts for securing to a child car seat in accordance with the disclosure.

DETAILED DESCRIPTION

The BobStop is an accessory device that gently restrains a child's forehead to prevent his or her head from bobbing and rolling when the child falls asleep in the car seat. In one embodiment, the accessory device 10 comprises a head retention piece 12 having a pair of side bands 14A-B secured thereto and extending in opposite directions outwardly therefrom along a common axis 13, illustrated in phantom in FIG. 1, and a center band 16 extending outwardly from head retention piece 12 in a direction normal to an axis 13. Accessory device 10 further comprises a back band 18 securable to one or more of the side bands 14A-B and center band 16 for securing the accessory device 10 to a car seat.

The head retention piece 12 may be made of fabric and shaped to accommodate the curvature of the forehead. In one embodiment, the head retention piece 12 may be made of fleece and/or lining materials which are soft and comfortable against the child's forehead and scalp. An animal face design or other graphic may adorn the headpiece to increase the attractiveness of the accessory device 10 to children and to reduce their resistance to using the device. In one embodiment, head retention piece 12 may have a generally triangular shape, as illustrated in FIG. 1, that extends at least partially from one side of the child car seat, across the child's forehead, to the other side of the child car seat.

Side bands 14A-B are either permanently or removably secured to head retention piece 12 and extend in opposite directions outwardly therefrom along a common axis 13, illustrated in phantom in FIG. 1. Side bands 14A-B may be secured to head retention piece 12 by any of stitching, buckles, hook and pile connectors, snaps, etc., at one or both ends thereof. In one embodiment, the side bands may have male buckle projection counterparts or female Velcro secured at one or both ends thereof. Side bands 14A-B may be implemented with elastic, webbing or other durable fabric. In one embodiment, the side bands 14A-B may have male or female buckle counterparts or hook or pile portions of a Velcro—like connector secured at one or both ends thereof.

A center band 16 is connected to the center of the head retention piece 12 and extends outwardly therefrom along an axis 13 substantially normal to an axis 13 over the top of the child's head to the back of the car seat where it attaches to the back band 18, as explained herein. The center band 16 prevents the child from accidentally pulling the head retention piece 12 over his or her face or neck. The center band 16, like side bands 14A-B may be implemented with elastic, webbing or other durable fabric. Center band 16, like side bands 14A-B, may be secured to head retention piece 12 by any of stitching, buckles, hook and pile connectors, snaps, etc., at one or both ends thereof. In one embodiment, the center band 16 may comprise a pair of bands 16A-B each having a first end sewn to head retention piece 12 and a second end securable to back band 18. In such embodiments, bands 16A-B comprising center band 16 are secured to each other, typically with stitching, at plural locations along respective lengths thereof so that adjacent locations at which the pair of bands are secured together define a slit 17 allowing passage of an object, such as a car seat tether or safety belt, through the center band 16. Bands 16A-B may have one of hook and pile sections of a hook and pile connector, such as Velcro, extending over a portion of their respective lengths to facilitate attachment of center band 16 to back band 18.

Back band 18, in one embodiment, is not integrally formed with head retention piece 12 but is securable to side bands 14 and centerpiece 16 as described herein. Back band 18 may be implemented with elastic, webbing or other durable fabric. In other embodiments, the back band 18 may consist of Velcro, elastic and/or a D-ring allowing for universal adjustability.

In the embodiment illustrated in FIGS. 1A-C, each of straps 14A-B may have a plurality of connectors 15 comprising either the hook or pile portion of a hook and pile connector. Similarly, each of bands 16A-B may have either the hook or pile portion of a hook and pile connectors 15 extending along the length portions thereof which are sewn together to form slit 17. The back band 18 may be comprised entirely of the male or female portion of a hook and pile connector 15 or may have strap ends affixed thereto either permanently with stitching or removably with a slidable loop 11.

In other embodiments, as illustrated in FIGS. 2A-C, center band 16 may be formed from a single strap having a plurality of locations comprising either the hook or pile portion of a hook and pile connector 15, similar to side bands 14A-B described previously. In such embodiment, band 18 may comprise a fabric member having short side straps attached at ends thereof and multiple locations on either side thereof comprising either the hook or pile portion of a hook and pile connector to facilitate connection to center band 16 and/or side bands 14A-B or Velcro placed on the child car seat.

In other embodiments, as illustrated in FIGS. 3A-B, the back band 18 may have a pair of female buckle receiving counterparts of buckles 20 at one or both ends thereof for receiving the projection buckle ends of buckles 20 of the side bands 14A-B. A least a portion of the back band 18 may comprise Velcro which attaches to stick on Velcro placed on the child car seat. Two strips of Automotive grade adhesive Velcro 19 may be adhered to each upper back side of the car seat. The Velcro has a temperature range of −40 to 185 degrees Fahrenheit and therefore resists break down due to the extreme temperatures possible in a car parked outdoors in winter or summer. A loop 21 may be formed at the end of center strap 16 not secured to head retention piece 12 for slidably receiving back band 18. Alternatively, back band 18 may have a slidable loop affixed there on an attachable to the free end of center band 16 the Velcro or other connector. In other embodiments, center strap 16 may be optionally secured to head retention piece 12 with a female buckle receiving counterpart of buckle 23 for receiving the projection buckle end of buckle 23 attached to head retention piece 12, or vice versa.

In one embodiment, a version of the BobStop compatible with booster seats uses an adhesively securable pile (female) portion of a Velcro connector while the convertible car seat version uses hook (male) adhesive Velcro.

In the contemplated embodiments, any of the side bands, back band, or center band may be of variable length with adjustment mechanisms for selectively adjusting the appropriate length thereof for maximum child comfort. In addition, the head retention piece, side bands, back band and center band may be securable to each other using any known mechanism such as buckles, clips, snaps, loops, hook and pile connectors such as Velcro, sewing etc. In one embodiment, the head retention piece, side and back bands may comprise a single continuous piece of material having a selectively adjustable length. In addition, any known means may be used to secure either the back band or side bands of the accessory device to the child car seat or booster seat including, but not limited to, hook and pile type connectors, snaps, buttons, buckles, etc.

In one embodiment, pressure releasing side clips may be used to secure the side bands 14 and back band together so that they may be released in the event of a possible crash impact to allow the child's head to move freely to dissipate any impact momentum.

In practice, the accessory device 10 is securable about the car seat in the following manner. First, the side bands 14 are extended around the sides of the car seat towards the back side thereof and removably secured to back band 18. Next, the center band 16 is extended around the top of the car seat towards the back side thereof and removably secured to back band 18.

The Bobstop can be mounted on most convertible car seats and booster seats. On convertible seats, a longer Velcro strip may be utilized to allow the BobStop to be adjusted upward as the child grows taller. The accessory retention device described here in may be packaged with other items, such as a small pillow to provide additional comfort/amusement to the child.

It will be obvious to those recently skilled in the art that modifications to the apparatus and process disclosed here in may occur, including substitution of various components or modes of connection, without parting from the true spirit and scope of the disclosure.

What is claimed is:

1. A head restraint apparatus for use with car seats comprising:
   a head retention piece;
   a pair of side bands extending outward from the head retention piece in opposite directions along a common axis; and
   a center band extending outward from the head retention piece in a direction substantially normal to the common axis,
   wherein the side bands and center band are securable together about a car seat,
   wherein the center band comprises a pair of bands secured at first ends thereof to the head retention piece and to each other at plural locations along respective lengths thereof.

2. The head restraint apparatus of claim 1 further comprising: a back band securable to one of the side bands and center band.

3. The head restraint apparatus of claim 2 wherein the back band is securable to the side bands and center band.

4. The head restraint apparatus of claim 1 wherein adjacent of the plural locations at which the pair of bands are secured together define at least one slit allowing passage of an object through the center band.

5. The head restraint apparatus of claim 2 wherein the back band is securable to the side bands by one of buckles or hook and pile connectors.

6. The head restraint apparatus of claim 2 wherein the back band is securable to the center band by one of a buckle or hook and pile connector.

7. A head restraint apparatus for use with seats comprising:
a head retention piece;
a pair of side bands extending outward from the head retention piece in opposite directions along a common axis;
a center band extending outward from the head retention piece in a direction substantially normal to the common axis; and
a back band securable to one of the side bands and center band,
wherein the center band includes a loop formed in an end thereof not attached to the head retention piece and wherein the back band extends through the loop.

8. The head restraint apparatus of claim 7 wherein the back band comprises one of a hook and pile connector attached thereto for securing to the other of the hook and pile connector attachable to a seat.

9. The head restraint apparatus of claim 7 wherein the pair of side bands each comprise one of a hook and pile connector attached thereto for securing to the other of the hook and pile connector attachable to a seat.

10. A kit comprising:
a head restraint apparatus for use with seats comprising a head retention piece having a pair of side bands extending outward therefrom along a common axis and a center band extending outward from the head retention piece in a direction substantially normal to the common axis, wherein the center band comprises a pair of bands secured at first ends thereof to the head retention piece and to each other at plural locations along respective lengths thereof;
a back band securable to the side bands and center band;
one or more securing means for securing any of the side bands, center band, or back band to the seat.

11. The kit of claim 10 wherein adjacent of the plural locations at which the pair of bands are secured together define at least one slit allowing passage of an object through the center band.

12. The kit of claim 10 wherein the back band is securable to the side bands by one of buckles or hook and pile connectors.

13. The kit of claim 10 wherein the back band is securable to the center band by one of a buckle or hook and pile connector.

14. The kit of claim 10 wherein the center band includes a loop formed in an end thereof not attached to the head retention piece and wherein the back band extends through the loop.

15. The kit of claim 10 wherein the side bands are attached to the head retention piece with stitching.

16. The kit of claim 10 wherein the side bands are attached to the head retention piece with buckles.

17. A method for securing a head restraint apparatus to a seat, the method comprising:
providing a head restraint apparatus comprising a head retention piece having a pair of side bands extending outward therefrom along a common axis and a center band extending outward from the head retention piece in a direction substantially normal to the common, wherein the center band comprises a pair of bands secured at first ends thereof to the head retention piece and to each other at plural locations along respective lengths thereof;
removably securing the side bands about sides of a seat with a back band;
removably securing the center band about a top of the seat with a back band; and
removably securing the back band to the seat.

18. The head restraint apparatus of claim 1 wherein the center band is removably connected to the head retention piece.

* * * * *